United States Patent
Anand (10) Patent No.: US 11,580,486 B2
(45) Date of Patent: Feb. 14, 2023

(54) ELECTRONIC NOTIFICATION APPARATUS

(71) Applicant: Visa International Service Association, San Francisco, CA (US)

(72) Inventor: Nilasha Hasthanthar Anand, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 30 days.

(21) Appl. No.: 16/607,062

(22) PCT Filed: May 26, 2017

(86) PCT No.: PCT/US2017/034652
§ 371 (c)(1),
(2) Date: Oct. 21, 2019

(87) PCT Pub. No.: WO2018/217211
PCT Pub. Date: Nov. 29, 2018

(65) Prior Publication Data
US 2020/0134555 A1 Apr. 30, 2020

(51) Int. Cl.
*G06Q 10/00* (2012.01)
*G06Q 10/0833* (2023.01)
(Continued)

(52) U.S. Cl.
CPC ....... *G06Q 10/0833* (2013.01); *G06F 16/252* (2019.01); *G06K 7/10722* (2013.01); *G06K 7/1413* (2013.01); *G06Q 20/36* (2013.01); *H04M 1/0291* (2013.01); *H04M 11/025* (2013.01)

(58) Field of Classification Search
None
See application file for complete search history.

(56) References Cited

U.S. PATENT DOCUMENTS 8,344,849 B2 * 1/2013 Larsson ................ B60R 25/25
340/5.2
9,508,239 B1 11/2016 Harrison et al.
(Continued)

FOREIGN PATENT DOCUMENTS

JP 2009278314 11/2009
JP 2015035673 2/2015
(Continued)

OTHER PUBLICATIONS

"A Smart Card Alliance Payments Council White Paper, Technologies for Payment Fraud Prevention: EMV, Encryption and Tokenization", White Paper, Smart Card Alliance, Payments Council, Available online at: https://www.emv-connection.com/downloads/2014/10/EMV-Tokenization-Encryption-WP-FINAL.pdf, Oct. 2014, 34 pages.

(Continued)

*Primary Examiner* — Tonya Joseph
(74) *Attorney, Agent, or Firm* — Kilpatrick Townsend & Stockton LLP (57) ABSTRACT

An electronic notification apparatus is disclosed. The electronic notification apparatus may include an image capture device which can scan a machine readable code on a physical object. A communication may thereafter be initiated to complete the transfer of the physical object to a user.

13 Claims, 5 Drawing Sheets

(51) Int. Cl.
  *G06F 16/25*  (2019.01)
  *G06K 7/10*  (2006.01)
  *G06K 7/14*  (2006.01)
  *G06Q 20/36*  (2012.01)
  *H04M 1/02*  (2006.01)
  *H04M 11/02*  (2006.01)

(56) References Cited

U.S. PATENT DOCUMENTS

| | | | |
|---|---|---|---|
| 11,055,644 B2* | 7/2021 | Mo | G06Q 10/063112 |
| 2003/0132296 A1* | 7/2003 | Silver | G06Q 10/08 235/385 |
| 2003/0231112 A1 | 12/2003 | Raju | |
| 2015/0120529 A1 | 4/2015 | Faaborg | |
| 2016/0224977 A1 | 8/2016 | Sabba et al. | |
| 2017/0220872 A1* | 8/2017 | Child | G08B 13/196 |
| 2017/0262798 A1* | 9/2017 | Kosseifi | G06F 21/88 |
| 2018/0089917 A1* | 3/2018 | Obaidi | H04N 7/188 |

FOREIGN PATENT DOCUMENTS

| | | | |
|---|---|---|---|
| JP | 2017086540 | 5/2017 | |
| KR | 1020020003716 | 1/2002 | |
| KR | 1020160144052 | 12/2016 | |
| WO | WO-2015199978 A1 * | 12/2015 | G06Q 20/3829 |

OTHER PUBLICATIONS

EP17911322.0, "Extended European Search Report", dated Jan. 30, 2020, 7 pages.
PCT/US2017/034652, "International Preliminary Report on Patentability", dated Dec. 5, 2019, 8 pages.
PCT/US2017/034652, "International Search Report and Written Opinion", dated Dec. 20, 2017, 11 pages.

* cited by examiner

ELECTRONIC NOTIFICATION APPARATUS

CROSS REFERENCE TO RELATED APPLICATIONS

This application is the US national stage of PCT/US2017/034652, filed May 26, 2017, and claims the benefit thereof, the disclosure of which is incorporated herein by reference in its entirety.

BACKGROUND

Different processing steps can be used to obtained resources. In some instances, goods can be ordered from a remotely located merchant. Goods can be shipped to the user who purchased them.

Some problems exist with existing resource acquisition systems. For example, in some cases, a user does not want to pay for the goods until they are actually delivered. This can be desirable in many instances. For example, goods that are paid for first and then delivered can be potentially stolen if the user is not home when the goods are delivered. In other instances, a user wants to be assured that the resource is delivered until the user actually pays for it. In the case of food, for example, food delivery services may become overwhelmed during peak periods and may not deliver the food in a timely manner. In such a case, it is better to pay for the food upon delivery since the delivery can be canceled if the delivery occurs too late to be useful.

While resource acquisition systems that allow users to pay for resources upon delivery are useful, a number of improvements can be made. For example, if the user ordering the resource is not at home, then the particular resource being delivered may need to be returned. Also, in some cases, the particular resource being delivered may be erroneously delivered to the wrong address. Still further, in some instances, a user may not have sufficient funds or the correct amount of cash to pay for the resource being delivered at the time of delivery.

Embodiments of the invention address these and other problems individually and collectively.

SUMMARY

Embodiments of the invention are directed to methods and systems that can use an electronic notification apparatus to conduct or initiate transactions.

One embodiment of the invention is directed to a method. The method includes receiving, by an electronic notification apparatus mounted on a building structure, and being in proximity to a physical object, object data. The object data can comprise interaction data for an interaction between a user and a resource provider providing the physical object. The method may also comprise determining, by the electronic notification apparatus, whether the interaction data is present in a database. The method may also comprise initiating, by the electronic notification apparatus, a communication with a remote server computer to complete transfer of the physical object to the user.

Another embodiment of the invention is directed to an electronic notification apparatus configured to be mounted to a wall of a structure. The structure may include a dwelling such as a home. The electronic notification apparatus can comprise a processor, a speaker coupled to the processor, an input element for inputting data into the electronic notification apparatus, and a non-transitory computer readable medium coupled to the processor. The non-transitory computer readable medium comprises code executable by the processor for implementing a method. The method comprises receiving object data from a physical object in proximity to the electronic notification apparatus. The object data comprises interaction data for an interaction between a user and a resource provider providing the physical object. The method also comprises determining whether the interaction data is present in a database, and initiating a communication with a remote server computer to complete transfer of the physical object to the user.

Further details regarding embodiments of the invention can be found in the Detailed Description and the Figures.

DETAILED DESCRIPTION

Embodiments of the invention can be applicable to the Internet of Things (IoT). In embodiments of the invention, a doorbell on a building structure such as a home can be used to make a payment on the user's behalf when a resource is delivered. The electronic doorbell apparatus can be used to initiate payment transactions, and can have the capability of connecting to a network to send and receive data. It may also have a biometric (e.g., fingerprint) recognition feature. The payment method used on the backend may utilize payment tokens, digital wallets, or any other suitable payment processing technology.

The doorbell apparatus can have a number of other features. For example, the doorbell apparatus can connect to an external network such as the Internet. It may also have a touch screen, and can communication with a communication device such as the user's mobile phone.

One embodiment of the invention is directed to a method that includes receiving, by an electronic notification apparatus such as a doorbell apparatus mounted on a building structure, and being in proximity to a physical object, object data. The physical object may be a good that was requested by the user and the object data may pertain to the particular physical object being delivered. The object data may be embodied by or accessible via a machine readable code such as a barcode. The object data can comprise interaction data for an interaction between a user and a resource provider providing the physical object. The interaction data may include information such as the name of the good being purchased, a product identifier, a merchant identifier, a merchant account number, a transaction amount, a delivery tracking number, a delivery service identifier, etc. The method may also comprise determining, by the electronic notification apparatus, whether the interaction data is present in a local or remote database. The interaction data may have been previously generated and stored in the database. The method may also comprise initiating, by the electronic notification apparatus, a communication with a remote server computer to complete transfer of the physical object to the user. In some embodiments, the initiation of the communication may occur by transmitting a token stored in the electronic notification apparatus to a processing computer to perform the payment processing. If the payment processing is completed, the transfer of the physical object to the user can be completed.

Prior to discussing specific embodiments of the invention, some terms may be described in detail.

An "interaction" can be a reciprocal action, effect, or influence. An interaction, for example, could be an exchange or transaction between two or more parties or the application of a force to an object.

A "value" can be some quantity that may be represented with numbers. An example of a value is a quantity such as a quantity of money.

An "interaction value" can be a quantity associated with an interaction. In some embodiments, an interaction value may be determined by a user, and may correspond to a preferred or maximum amount which the user is willing to expend to obtain a particular resource.

A "resource" is something that may be used by an entity or transferred between entities. Examples of resources include physical objects such as goods, services, information, and/or access.

A "resource identifier" may include any information which identifies a particular resource. Examples of resource identifiers may include codes that identify resources, descriptions of resources, or any other data that identifies a resource.

A "physical object" may include any suitable article that is tangible. Examples of physical objects may include packages that contain goods or products such as electronics, clothing, media (e.g., books, magazines), documents such as passports, official documents, etc.

"Object data" may include any suitable information related to a physical object. Such information may include information describing the object and/or "interaction data" that may relate to the object. For example, interaction data may include information regarding the interaction between a user wishing to obtain the physical object and a resource provider that provides the physical object. For instance, interaction data may include information regarding the resource provider (e.g., a resource provider identifier, a resource provider account number, etc.), a value associated with the object, a user identifier for the user wishing to obtain the resource, a transaction identifier associated with the transaction to obtain the resource, a carrier ID identifying the mechanism used to deliver the object, etc.

A "token" may be a substitute for a real credential. An interaction token can be used in an interaction between two entities. In some embodiments, the interaction token may be a substitute for a payment account number, such as a primary account number (PAN). For example, an interaction token may include a series of alphanumeric characters that may be used as a substitute for an original account identifier. For example, an interaction token "4900 0000 0000 0001" may be used in place of a PAN "4147 0900 0000 1234." In some embodiments, an interaction token may be "format preserving" and may have a numeric format that conforms to the account identifiers used in existing transaction processing networks (e.g., ISO 8583 financial transaction message format).

"Tokenzation" can include a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information which may be replaced with a substitute value (i.e., a token).

A "token service computer" can include a computer that services tokens. In some embodiments, a token service computer can facilitate requesting, determining (e.g., generating) and/or issuing tokens, as well as maintaining an established mapping of tokens to credentials such as primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token vault" may be an example of a token service and can include a repository that maintains established token mappings. It may be present in a token service computer. According to various embodiments, the token vault may also maintain other attributes of the token requestor that may be determined at the time of registration. The attributes may be used by the token provider to apply domain restrictions or other controls during transaction processing. In some embodiments, the token vault may be a part of the token provider. Alternatively, the token vault may be a remote repository accessible to the token provider. Token vaults, due to the sensitive nature of the data mappings that are stored and managed in them, may be protected by strong underlying physical and logical security.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, makes a request to receive a PAN associated with a token.

A "communication device" may comprise any suitable device that can be used for communication. A communication device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote or direct communication capabilities. A communication device may comprise any suitable hardware and software for performing such functions, and may also include multiple devices or components (e.g. when a device has remote access to a network by tethering to another device—i.e. using the other device as a modem—both devices taken together may be considered a single communication device).

A "resource provider" may be an entity that can provide resources. Examples of resource providers include merchants, governmental agencies, etc.

A "merchant" may typically be an entity that engages in transactions and can sell goods or services, or provide access to goods or services.

An "acquiring entity" is an entity which can come into possession of something. An acquiring entity may be a business entity (e.g., a commercial bank) that has a business relationship with a particular merchant or other entity. An acquiring entity may operate an acquiring entity computer, which may be generically referred to as a "transport computer."

An "authorizing entity" is an entity which can authorize or approve interactions. An authorizing entity may typically refer to a business entity (e.g., a bank) that maintains an account for a user, and is capable of authorizing interactions such as payment transactions, for example the purchase of goods or services.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Figure 1:
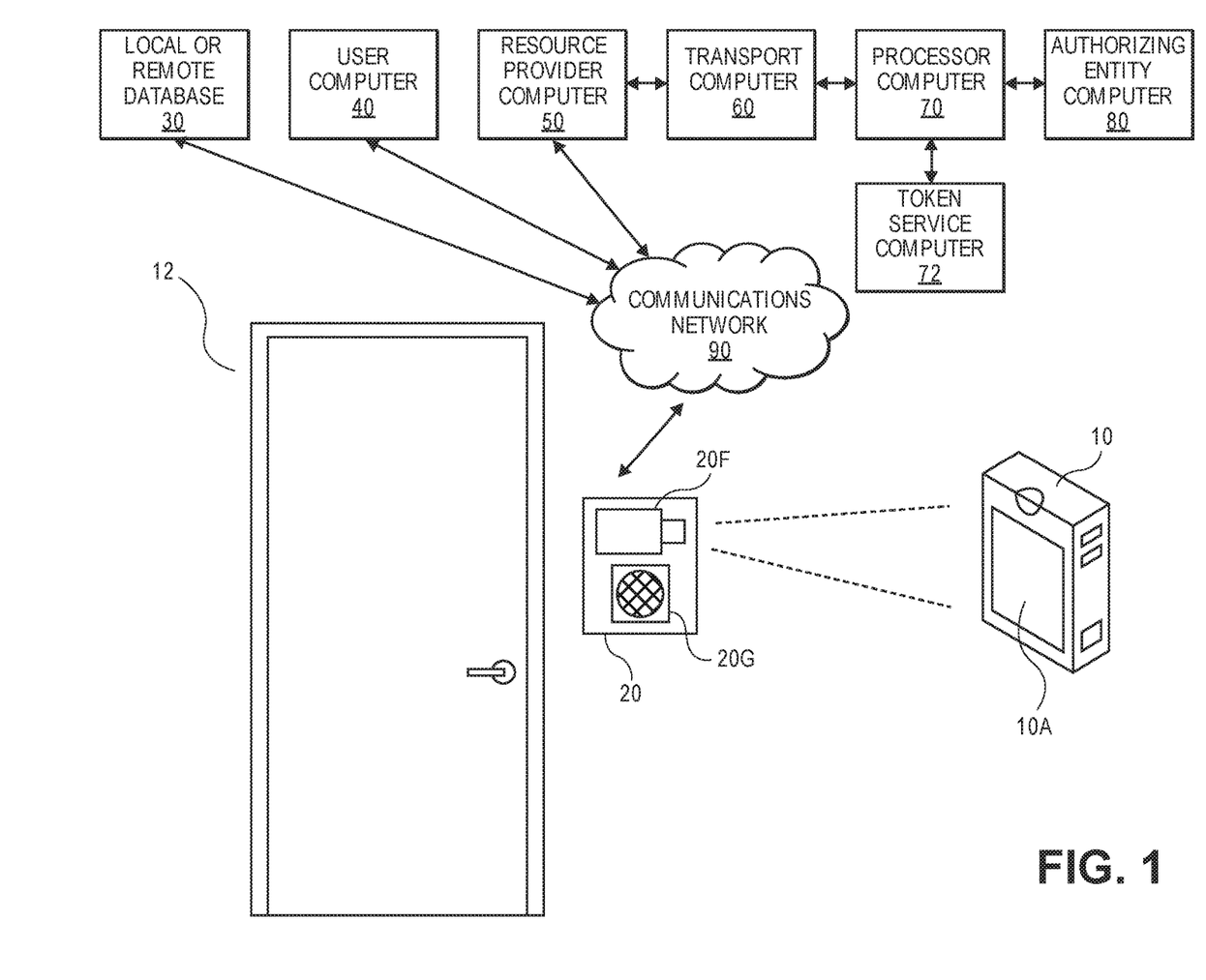
FIG. 1 shows a block diagram of a system according to an embodiment of the invention.

FIG. 1 shows a system comprising an electronic notification apparatus 20 that may be attached to a wall proximate to a door 12. The door 12 may be part of a building structure such as a building or home. The electronic notification apparatus 20 may be in communication with a local or remote database 30, a user computer 40, and a resource provider computer 50 via a communications network 90. The resource provider computer 50 may be in communication with an authorizing entity computer 80 via a transport computer 60 and a processor computer 70. The processor computer 70 may be in communication with a token service computer 72.

The electronic notification apparatus 20 may be a doorbell apparatus and include an image capture device 20F (e.g., a camera, barcode scanner, etc.) and a single button 20G. The image capture device 20F can capture an image of a machine readable code 10A on a physical object 10 to be delivered to the user that resides in the building structure. Further details the features of a suitable electronic notification apparatus 20 are provided below.

This communications network 90 can take the form of any suitable communication network, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the entities, providers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
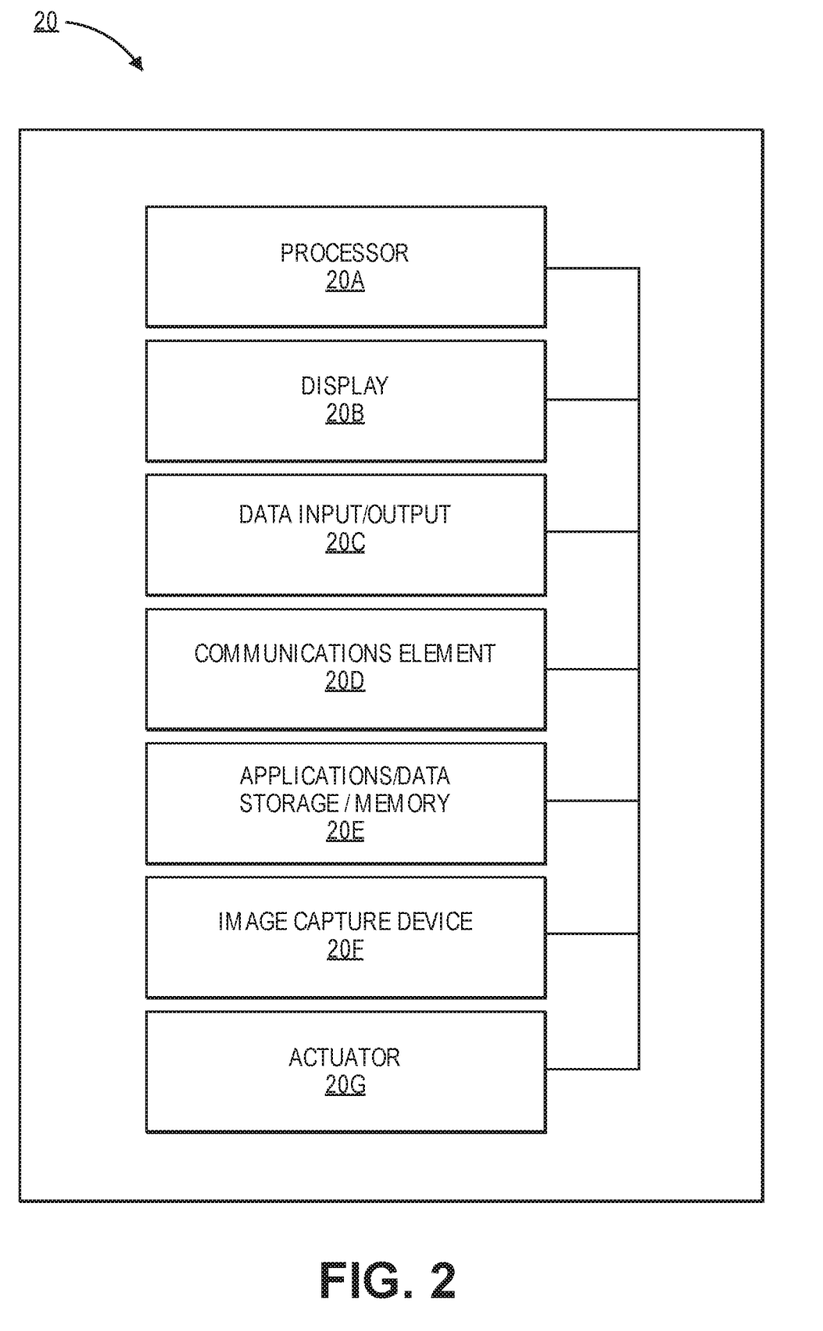
FIG. 2 shows a block diagram of an electronic notification apparatus according to an embodiment of the invention.

FIG. 2 shows an example of an electronic notification apparatus 20 according to some embodiments of the invention. Electronic notification apparatus 20 may include circuitry that is used to enable certain device functions, and a housing that encloses that circuitry. The functional elements responsible for enabling those functions may include a processor 20A that can execute instructions that implement the functions and operations of the electronic notification apparatus 20. The processor 20A may access data storage 20E (or another suitable memory region or element) to retrieve instructions or data used in executing the instructions. Data input/output elements 20C, such as a keyboard or touchscreen, may be used to enable a user to operate the electronic notification apparatus 20 and input data (e.g., user authentication data). Data input/output elements may also be configured to output data (for example, via a speaker). Display 20B may also be used to output data to a user. Communications element 20D may be used to enable data transfer between the electronic notification apparatus 20 and a wired or wireless network. Electronic notification apparatus 20 may also include an image capture device 20F such as a camera coupled to the processor 20A. Electronic notification apparatus 20 may also include an actuator 20G, which may be in the form of a button on a front face of the electronic notification apparatus. The actuator 20G can be depressed or selected to initiate a sound such as a doorbell chime from the speaker. In some embodiments, the electronic notification apparatus 20 only has one depressible or selectable button.

The data storage 20E may comprise a computer readable medium comprising, code, executable by the processor 20A to implement a method comprising: receiving object data, where the object data comprises interaction data for an interaction between a user and a resource provider providing the physical object; determining whether the interaction data is present in a database; and initiating a communication with a remote server computer to complete transfer of the physical object to the user.

In some embodiments, the data storage 20E may also include a secure memory such as secure element. If present, the secure element may store credentials such as payment credentials. In some embodiments, the credentials may include token such as payment tokens.

Figure 3:
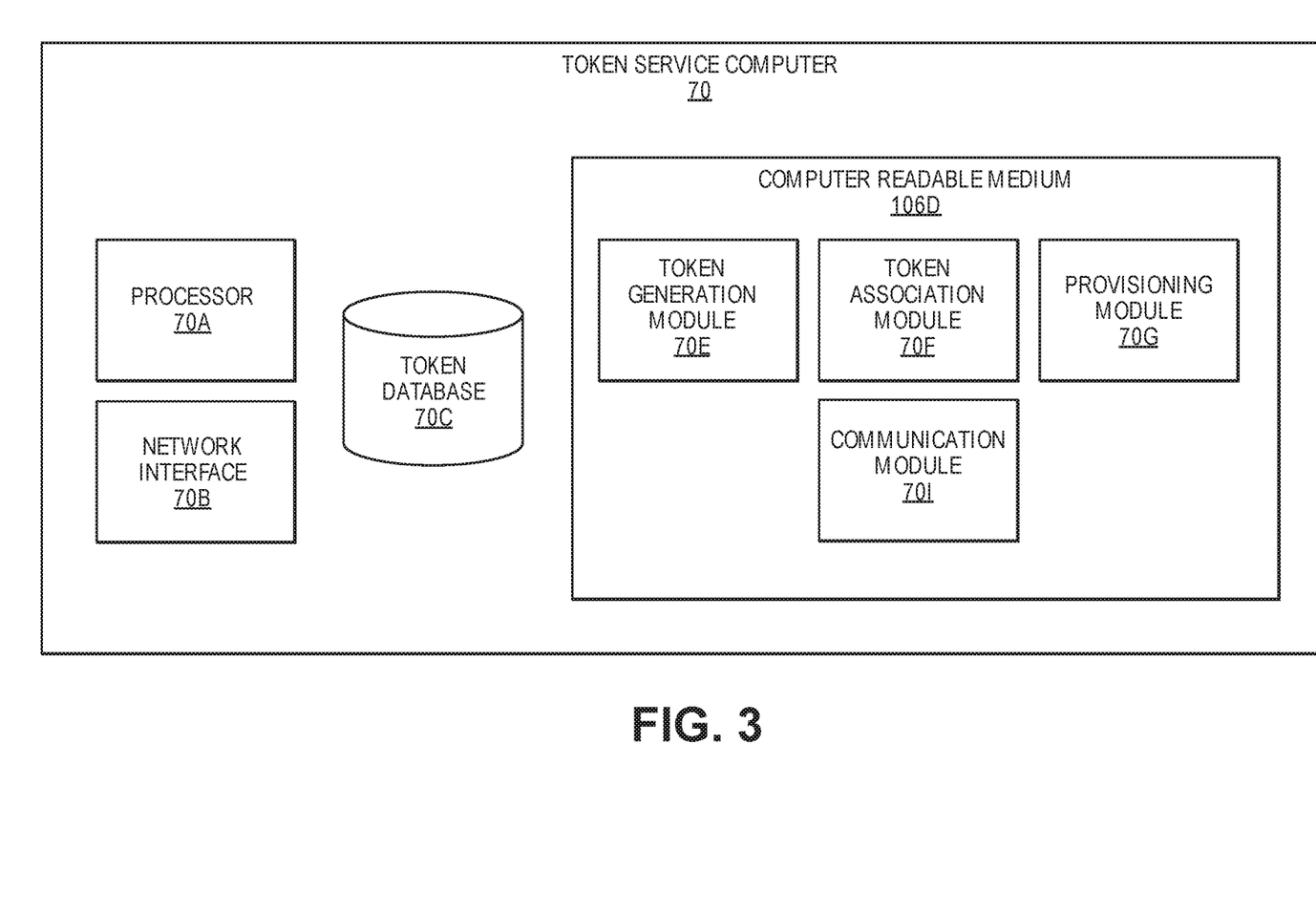
FIG. 3 shows a block diagram of a token service computer according to an embodiment of the invention.

FIG. 3 shows a block diagram showing basic components that may reside in an exemplary token service computer 70. The token service computer 70 may form part of a payment processing network in some embodiments of the invention. The token service computer 70 comprises a processor 70A, a network interface 70B, a token database 70C, and a computer readable medium 70D.

The computer readable medium 70D may comprise a token generation module 70E, a token association module 70F, a provisioning module 70G, and a communication module 70I.

The token generation module 70E may comprise code that causes the processor 70A to generate a token. In some embodiments, the token may include 16 digits and may resemble a PAN.

The token association module 70F may comprise code that causes the processor 70A to associate a token with other user data (e.g., e-mail addresses, telephone numbers, primary account numbers, etc.). For example, the token association module 70F may contain logic that causes the processor 70A to link a generated a token with received user input data, and to store the information in the token database 70C.

The provisioning module 70G may comprise code that causes the processor 70A to provision tokens. For example, the provisioning module 70G may contain logic that causes the processor 70A to generate provisioning scripts, and to provide the provisioning scripts, a token, and any other suitable information to an electronic notification apparatus.

The communication module 70I may comprise code that causes the processor 70A to generates messages, reformat messages, and/or otherwise communicate with other entities. For example, the communication module 70I may contain logic that causes the processor 70A to identify a token in a received authorization request message, reformat the authorization request message so that the token is replaced with a real credential, and forward the authorization request message to an authorization entity. The communication module 70I may also contain logic that causes the processor 70A to identify a real credential in a received authorization response message, reformat the authorization response message so that the real credential is replaced with the token, and forward the authorization response message to a resource provider computer.

Figure 4:
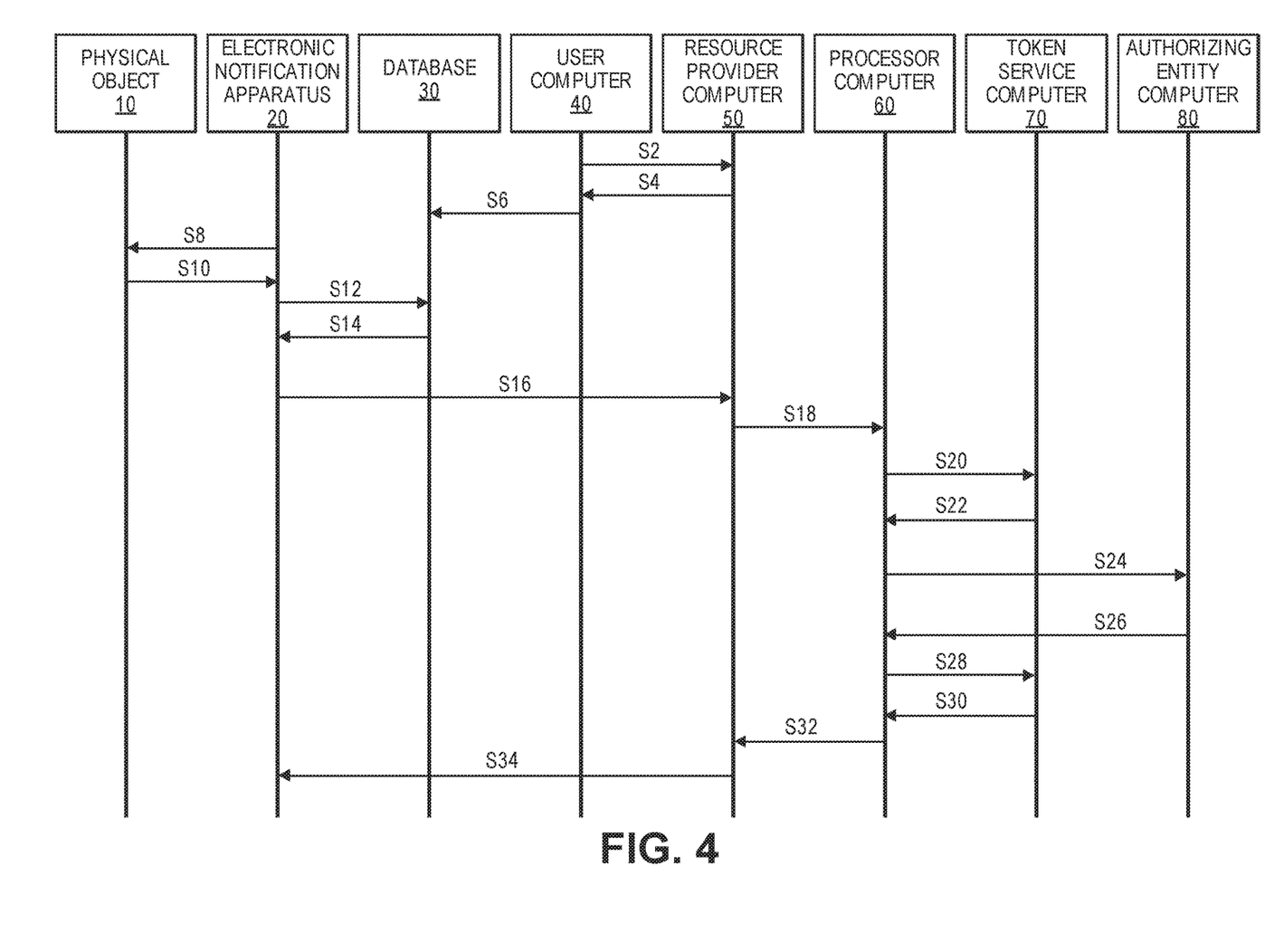
FIG. 4 shows a flow diagram illustrating a method according to an embodiment of the invention where interaction data associated with a physical object can be found in a database.
Figure 5:
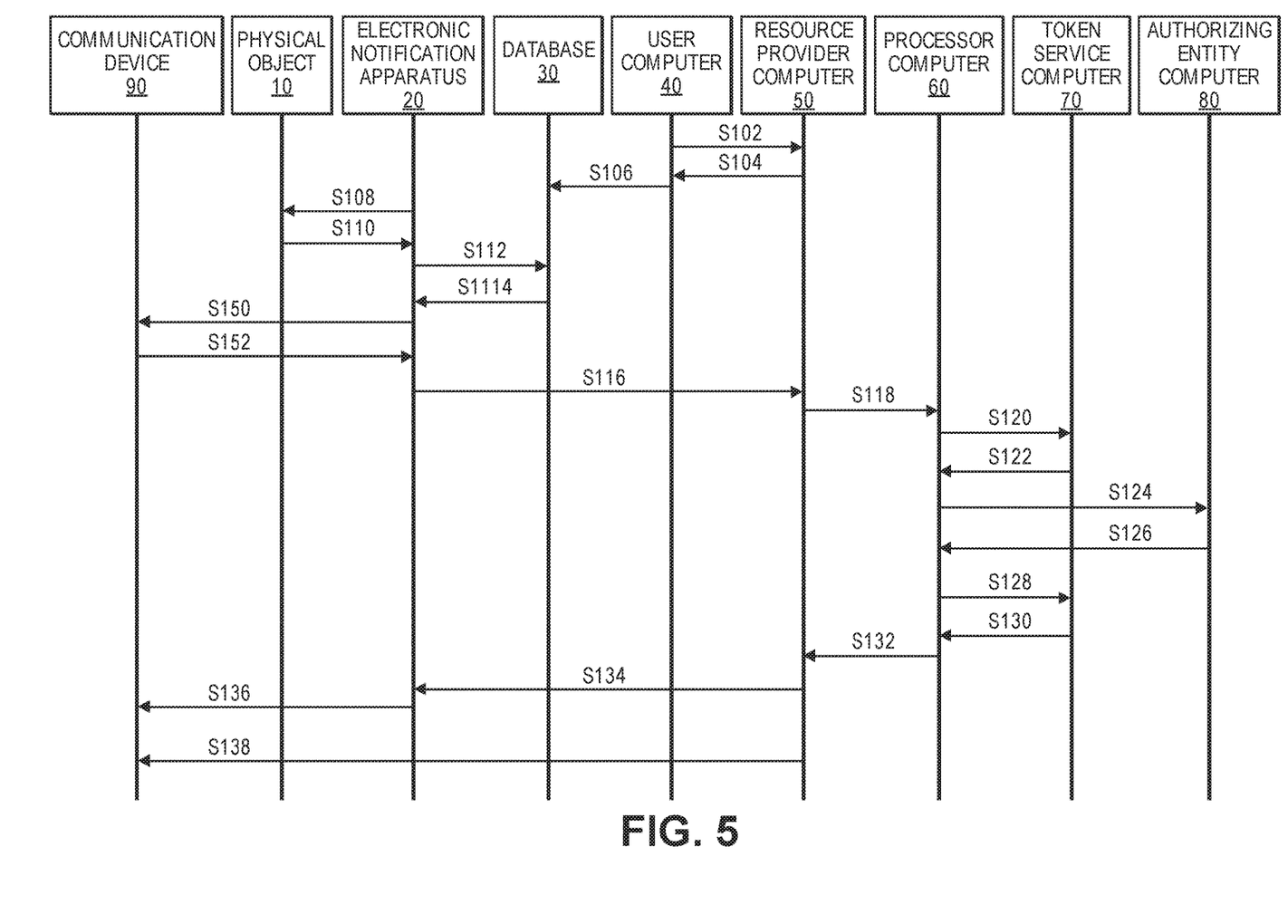
FIG. 5 shows a flow diagram illustrating a method according to another embodiment of the invention where interaction data associated with a physical object is not readily found in a database.

A method according to embodiments of the invention can be described with respect to FIGS. 4 and 5. Some elements in other Figures are also referred to. The steps shown in the method may be performed sequentially or in any suitable order in embodiments of the invention. In some embodiments, one or more of the steps may be optional.

The various messages in FIGS. 4 and 5 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, and/or a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

Referring to FIG. 4, in step S2, a user may operate a user computer 40 to obtain a resource from a resource provider operating the resource provider computer 50. For example, the resource provider may be a merchant. The user may be a consumer that wishes to purchase a good from the merchant in a transaction. The consumer may request shipment of the good from the merchant. The good may eventually be shipped to the user. In other embodiments, the interaction between the user and the resource provider need not be in the context of a purchase transaction. For example, instead of the purchase of a good from the resource provider, the resource provider could be an entity such as a governmental agency that might provide a resource such as a driver's license, social security card, or other official documentation.

Interaction data may be generated as a result of the interaction between the resource provider and the user. For example, such interaction data may include an identification of the resource to be obtained, the value or price to be paid from the user to the resource provider for the resource, the shipping address of the user, the mode of delivery for the resource (e.g., overnight, regular deliver, by drone, by courier, etc.), a transaction identifier, a resource provider identifier (e.g., a resource provider account number, a communication address of the resource provider, etc.), a time and date of the interaction, the user's intended mode of payment, etc.

In step S4, after the user and the resource provider have agreed upon the terms for obtaining the resource, the resource provider computer 50 may transmit an acknowledgement back to the user computer 40.

In step S6, the user computer 40 may store the interaction data in a location or remote database 30. In some embodiments, the database 30 may be present in the user computer 40, or in some other database that is proximate to the user computer 40. Alternatively, the database 30 may be a remote database or a cloud-based database. At this point, the user may not have paid for the good or service being ordered, but may simply inform the resource provider that it does wish to obtain the indicated resource.

After the indication of the transaction is stored in the database 30, the resource provider may then send the requested resource to the user. The delivery of the resource may include physically delivering the requested resource. The resource to be delivered is in the form of a physical object. The delivery of the physical object may be made from the resource provider to the user via a delivery mechanism such as a courier, drone, or automated vehicle.

Once the physical object arrives at the dwelling of the user, the delivery mechanism may ring the electronic notification apparatus 20. For example, the delivery mechanism may include a courier that drives a truck to the user's dwelling, walks up to the electronic notification apparatus 20 and depresses the actuator on the electronic notification apparatus 20. A chime or other sound may then be produced in response to the depression of the actuator in the electronic notification apparatus 20. In some cases, the user may not be home and may not open the door to the user's dwelling. In other embodiments, the user may speak to the courier using a communication link between the electronic notification apparatus 20 and the user's communication device.

Whether or not the user is available, the courier may be prompted to place a machine readable code on the physical object near an image capture device in the electronic notification apparatus 20. The prompt may come from a speaker or display in the electronic notification apparatus 20.

In steps S8 and S10, the electronic notification apparatus 20 may take a picture of a machine readable code 10A on the requested physical object 10. As illustrated in FIG. 1, the physical object 10 may include a machine readable code 10A such as a bar code. An image capture device 20F such as a camera may take a picture of the machine readable code 10A.

Once the electronic notification apparatus 20 obtains the machine readable code 10A on the physical object 10, it may decode it to determine object data, which may include the interaction data. In some embodiments, the machine readable code 10A may actually encode the object data and/or the interaction data. In other embodiments, the machine readable code 10A may include an electronic address (e.g., an address of a remote server computer) from which the object data and/or the interaction data may be retrieved.

In step S12, after the electronic notification apparatus 10 obtains the interaction data, the electronic notification apparatus 20 may check the local or remote database 30 to determine if the interaction data obtained using the machine readable code matches previously generated interaction data stored in the local or remote database 30. If a match is found, then the database 30 may inform the electronic notification apparatus of the match in step S14. For example, the machine readable code on the physical object 10 may encode an identification of the product being delivered (e.g., an SKU or stock keeping unit number), the price of the product, a transaction identifier, and a time and date of when the product was requested by the user. The electronic notification apparatus 20 may determine that this very same information is present in the database 30.

In step S14, the database 30 informs the electronic notification apparatus 20 if a match occurred. If no match occurred, then the electronic notification apparatus 20 may inform the delivery mechanism that there is no record of the request for the physical object 10, and the delivery mechanism may return the requested physical objection 10 to the resource provider. If a match did occur, then the process may continue in step S16 by initiating a communication with a remote server computer such as the processor computer 60.

In step S16, in response to the determination that a match exists, the electronic notification apparatus 20 may transmit a communication comprising the token and other transaction information (e.g., the price of the product being delivered, a verification value associated with the token, etc.) to the resource provider computer 50. In some embodiments, the token and the transaction information may be present in an authorization request message that can be transmitted from the electronic notification apparatus 20. In some embodiments, the token may be retrieved from a secure memory in the electronic notification apparatus 20.

In some embodiments, as an optional additional security measure, the electronic notification apparatus 20 may capture a biometric (e.g., a fingerprint, retinal scan, voiceprint, etc.) of the courier delivering the physical object 10. If the biometric of the courier matches an expected biometric, then the electronic notification apparatus 20 may retrieve the token. This can be used to ensure that the expected delivery of the physical object is in fact occurring. The biometric data of the biometric of the courier may have been provided to the electronic notification apparatus 20 or a database in communication with the electronic notification apparatus 20, by the organization that employs the courier. This may have been initiated at the request of a particular resource provider.

In step S18, if the electronic notification apparatus 20 did not generate an authorization request message, then the resource provider computer 50 may generate and transmit an authorization request message to the processor computer 60. In this case, the electronic notification apparatus 20 may transmit the information needed to generate the authorization request message. In some embodiments, the authorization request message may be transmitted from the resource provider computer 50 to the processor computer 60 via a transport computer (e.g., an acquirer computer) operated by an entity (e.g., an acquirer) associated with the resource provider.

In step S20, after the processor computer 60 receives the authorization request message, it may detokenize the token. It may do so by transmitting the token to the token service computer 70. After receiving the token, the token service computer 70 may then look up a real credential (e.g., a primary account number or PAN) associated with the token in a token database.

In step S22, after the token service computer 70 has obtained the real credential, the token service computer 70 may transmit the real credential back to the processor computer 60.

In step S24, the processor computer 60 may replace the token with the real credential in the authorization request message and may transmit the modified authorization request message to the authorizing entity computer 80 for authorization.

After the authorization entity computer 80 receives the authorization request message, it may evaluate it. The authorization entity computer 80 may determine whether or not the account associated with the real credential has sufficient funds or credit to conduct the transaction. The authorization entity computer 80 may also perform any desired fraud detection processes on the transaction to determine if the transaction is potentially fraudulent.

In step S26, after the authorizing entity computer 80 generates an authorization response message comprising the real credential, it may transmit it to the processor computer 60. The processor computer 80 receives the authorization response message with the real credential.

In step S28, after receiving the authorization response message with the real credential, the processor computer 60 may retrieve the token corresponding to the real credential from the token service computer 70.

In step S30, the token server computer 70 may retrieve the token corresponding to the real credential and may transmit it to the processor computer 60.

In step S32, the processor computer 50 may generate a modified authorization response message and may transmit it to the resource provider computer 50. The resource provider computer may receive the authorization response message.

In step S34, the resource provider computer 50 may transmit the authorization response message or a different type of transaction completion message to the electronic notification apparatus 20, possibly another user communication device (not shown) operated by the user, or even the courier's communication device.

After the resource provider computer receives the authorization response message, the resource provider computer 50 can be assured of payment, and can indicate to the courier that the physical object 10 can be given to the user, left near the electronic notification apparatus 20 (e.g., on a doorstep, in a mail slot, or in a locker only accessible by the user). At this point, transfer of the physical object from the resource provider to the user is completed.

At a later time, a clearing and settlement process between the authorizing entity computer 80 and a transport computer operated by an acquirer may take place.

FIG. 5 shows another embodiment of the invention where a transaction is conducted where the electronic notification apparatus 20 finds no match for the delivered physical object 10 in the database 30. In this case, the user may be asked whether or not delivery of the resource is still desired.

In FIG. 5, steps S102, S104, S106, S108, S110, and S112 are (respectively) similar to steps S2, S4, S6, S8, S10, and S12 in FIG. 4, and those steps are incorporated herein. The descriptions of these steps need not be repeated.

In step S114, however, the database 30 informs the electronic notification apparatus 20 that the interaction data obtained from the physical object 10 cannot be found in the database 30.

Instead of rejecting the physical object 10, in step S150, the electronic notification apparatus 20 may initiate the transmission of an approval request message to a communication device 90 operated by the user.

In step S152, the electronic notification apparatus 20 may transmit an approval response message confirming that delivery of the resource 90 is acceptable. The electronic notification apparatus 20 may record this intent to receive the physical object 10.

In FIG. 5, steps S116, S118, S120, S122, S124, S126, S128, S130, S132, and S134 can be similar to steps S16, S18, S20, S22, S24, S26, S28, S30, S32, and S34, and those steps are incorporated herein. The descriptions of these steps need not be repeated.

In step S136, the electronic notification apparatus 20 may transmit a message to the communication device 90 informing it that the payment transaction was successful. In other embodiments, as shown in step S138, the resource provider computer 50 may transmit a confirmation message directly to the communication device 90.

After the resource provider computer 50 receives the authorization response message, the resource provider computer 50 can be assured of payment, and can indicate to the courier that the physical object 10 can be given to the user, left near the electronic notification apparatus 20 (e.g., on a doorstep, in a mail slot, or in a locker only accessible by the user). At this point, transfer of the physical object 10 from the resource provider to the user is completed.

At a later time, a clearing and settlement process between the authorizing entity computer 80 and a transport computer operated by an acquirer may take place.

Other payment flows are possible in other embodiments of the invention. For example, as noted above, the machine readable code on the physical object 10 may be used to obtain a merchant's account number. Thus, instead of transmitting a transaction request message from the electronic notification apparatus 20 to the resource provider computer 50, the transaction request message may be transmitted directed to the processor computer 60. The processor computer 60 may the push funds into the merchant's account using the merchant's account number. The processor computer 60 may use an OCT (original credit transaction) to credit the merchant's account, while it may use an AFT (account funding transaction) to debit the user's account.

Also, in other embodiments, tokens need not be used. Instead, real credentials may be used in place of tokens. In this case, de-tokenization processes need not be utilized.

Also, in some embodiments, various data elements may be encrypted or decrypted by the electronic notification apparatus. For example, after decoding the machine readable code on a physical object, the electronic notification apparatus may determine an encrypted merchant account number. The electronic notification apparatus may have an appropriate decryption key to decript the encrypted account number. In this case, the electronic notification apparatus may send the decrypted account number to a processor computer so that a payment transaction can be completed.

Embodiments of the invention have a number of advantages over conventional pay upon delivery systems. In embodiments of the invention, payment upon delivery can occur whether or not the user requesting the resource is present. In addition, by confirming that the interaction data obtained from the object data on a physical object matches interaction data stored in a database, the delivery mechanism that delivers the resource can be assured that it is delivering the resource to the correct building structure and user. Further, using embodiments of the invention, payments can be initiated automatically upon delivery of an object, without the need to have a user present to accept delivery of the object.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by an electronic notification apparatus mounted on a building structure, and being in proximity to a physical object, object data, wherein the object data comprises interaction data for an interaction between a user and a resource provider providing the physical object, the electronic notification apparatus including an image capture device, the object data being in a form of a machine-readable code, wherein the electronic notification apparatus receives the object data by using the image capture device to capture an image of the machine-readable code and decodes the image to obtain the object data, the interaction data including an intended mode of payment for the user for the physical object and a transaction amount associated with a transfer of the physical object to the user;

determining, by the electronic notification apparatus that the interaction data matches previously generated interaction data stored in a database;

receiving, by the electronic notification apparatus, biometric data of a courier delivering the physical object to the building structure, the biometric data obtained by the electronic notification apparatus;

comparing, by the electronic notification apparatus, the biometric data of the courier to expected biometric data previously provided to the electronic notification apparatus and stored in the electronic notification apparatus; and responsive to determining that the interaction data matches the previously generated interaction data and that the biometric data matches the expected biometric data, automatically initiating, by the electronic notification apparatus, a communication comprising a payment token and an amount associated with the physical object to a remote server computer to complete transfer of the physical object to the user, wherein the remote server computer obtains a real credential associated with the payment token and obtains authorization for the interaction using the real credential.

2. The method of claim 1, wherein the electronic notification apparatus is an electronic doorbell apparatus.

3. The method of claim 1, wherein the electronic notification apparatus is a doorbell apparatus.

4. The method of claim 1, further comprising:
communicating, by a user computer with a resource provider computer operated by the resource provider to request shipment of the physical object.

5. The method of claim 1, wherein the physical object is a package.

6. An electronic notification apparatus configured to be mounted to a wall of a structure, the electronic notification apparatus comprising:
a processor;
a speaker coupled to the processor;
an image capture device coupled to the processor;
an input element for inputting data into the electronic notification apparatus; and
a non-transitory computer readable medium coupled to the processor, the non-transitory computer readable medium comprising code executable by the processor for implementing a method comprising:
receiving object data from a physical object in proximity to the electronic notification apparatus, wherein the object data comprises interaction data for an interaction between a user and a resource provider providing the physical object, the object data being in a form of a machine-readable code, wherein the electronic notification apparatus receives the object data by using the image capture device to capture an image of the machine-readable code and decodes the image to obtain the object data, the interaction data including an intended mode of payment for the user for the physical object and a transaction amount associated with a transfer of the physical object to the user;
determining that the interaction data matches previously generated interaction data stored in a database;
receiving biometric data of a courier delivering the physical object to the structure, the biometric data obtained by the electronic notification apparatus;
comparing the biometric data of the courier to expected biometric data previously provided to the electronic notification apparatus and stored in the electronic notification apparatus; and responsive to determining that the interaction data matches the previously generated interaction data and that the biometric data matches the expected biometric data, automatically initiating, by the electronic notification apparatus, a communication comprising a payment token and an amount associated with the physical object to a remote server computer to complete transfer of the physical object to the user, wherein the remote server computer obtains a real credential associated with the payment token and obtains authorization for the interaction using the real credential.

7. The electronic notification apparatus of claim 6, further comprising a secure data element, wherein the payment token is stored in the secure data element of the electronic notification apparatus.

8. The electronic notification apparatus of claim 6, wherein the non-transitory computer readable medium comprises code for a doorbell chime.

9. The electronic notification apparatus of claim 6, wherein the electronic notification apparatus is an electronic doorbell apparatus.

10. The electronic notification apparatus of claim 6, wherein the input element is in a form of a single button.

11. The electronic notification apparatus of claim 6, further comprising a housing enclosing the processor and the non-transitory computer readable medium, and wherein the speaker is external to the housing.

12. The electronic notification apparatus of claim 6, further comprising a housing, and the input element on the housing, the input element being in a form of a single button.

13. The electronic notification apparatus of claim 6, wherein a front face of the electronic notification apparatus includes only one button.

* * * * *